United States Patent
Keppeler et al.

(10) Patent No.: US 12,234,338 B2
(45) Date of Patent: Feb. 25, 2025

(54) METHOD FOR PRODUCING FOAM PARTICLES MADE OF THERMOPLASTIC ELASTOMERS WITH POLYAMIDE SEGMENTS

(71) Applicant: BASF SE, Ludwigshafen am Rhein (DE)

(72) Inventors: Uwe Keppeler, Ludwigshafen (DE); Juergen Bartl, Ludwigshafen (DE); Juergen Ahlers, Ludwigshafen (DE); Christian Daeschlein, Herne (DE); Peter Gutmann, Ludwigshafen (DE); Frank Prissok, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 61 days.

(21) Appl. No.: 16/311,888

(22) PCT Filed: Jun. 21, 2017

(86) PCT No.: PCT/EP2017/065275
§ 371 (c)(1),
(2) Date: Dec. 20, 2018

(87) PCT Pub. No.: WO2017/220671
PCT Pub. Date: Dec. 28, 2017

(65) Prior Publication Data
US 2019/0203009 A1 Jul. 4, 2019

(30) Foreign Application Priority Data

Jun. 23, 2016 (EP) .................... 16175980

(51) Int. Cl.
| | | |
|---|---|---|
| *C08J 9/18* | (2006.01) | |
| *B29C 44/34* | (2006.01) | |
| *B29K 77/00* | (2006.01) | |
| *B29K 101/12* | (2006.01) | |
| *C08G 69/40* | (2006.01) | |
| *C08J 9/12* | (2006.01) | |
| *C08J 9/14* | (2006.01) | |
| *C08J 9/232* | (2006.01) | |

(52) U.S. Cl.
CPC ............ *C08J 9/18* (2013.01); *B29C 44/3461* (2013.01); *C08G 69/40* (2013.01); *C08J 9/122* (2013.01); *C08J 9/141* (2013.01); *C08J 9/232* (2013.01); *B29C 44/3453* (2013.01); *B29K 2077/00* (2013.01); *B29K 2101/12* (2013.01); *B29K 2995/0063* (2013.01); *C08J 2201/032* (2013.01); *C08J 2201/034* (2013.01); *C08J 2300/22* (2013.01); *C08J 2300/26* (2013.01); *C08J 2377/00* (2013.01); *C08J 2377/06* (2013.01)

(58) Field of Classification Search
None
See application file for complete search history.

(56) References Cited

U.S. PATENT DOCUMENTS

| | | | | |
|---|---|---|---|---|
| 4,704,239 | A | * | 11/1987 | Yoshimura ............... C08J 9/122 |
| | | | | 264/DIG. 13 |
| 2010/0222442 | A1 | * | 9/2010 | Prissok ................ A43B 13/023 |
| | | | | 521/56 |
| 2016/0121524 | A1 | | 5/2016 | Däschlein et al. |
| 2016/0244583 | A1 | * | 8/2016 | Keppeler ............ B29C 44/3453 |
| 2016/0244584 | A1 | | 8/2016 | Keppeler |
| 2016/0297943 | A1 | | 10/2016 | Däschlein et al. |
| 2017/0283555 | A1 | * | 10/2017 | Takano .................. G01N 25/20 |

FOREIGN PATENT DOCUMENTS

| | | | | |
|---|---|---|---|---|
| EP | 0673963 A1 * | 9/1995 | ......... B29C 44/3446 |
| EP | 2336225 A1 * | 6/2011 | ............... C08J 9/18 |
| JP | 60-42432 A | 3/1985 | |
| JP | 2016-537450 | 12/2016 | |
| RU | 2 371 455 C2 | 1/2008 | |
| WO | WO 2006/045513 A1 | 5/2006 | |
| WO | 2007/082838 | 7/2007 | |
| WO | WO 2011/134996 A1 | 11/2011 | |
| WO | WO 2014/198779 A1 | 12/2014 | |
| WO | 2015/052020 | 4/2015 | |
| WO | WO 2015/052019 A1 | 4/2015 | |
| WO | WO 2015/052265 A1 | 4/2015 | |

(Continued)

OTHER PUBLICATIONS

Smith et al (Valve Selection Handbook, Fifth Edition, Elsevier 2004, Chapter 3, pp. 47-151) (Year: 2004).*
Sheth et al (Solid state structure-property behavior of semicrystalline poly(ether-block-amide) PEBAX thermoplastic elastomers, Polymer 44 (2003) 743-756). (Year: 2003).*
Odian (Principles of Polymerization, Fourth Edition. 2004 John Wiley & Sons, Inc, Chapter 1, pp. 1-38). (Year: 2004).*
International Search Report issued Aug. 8, 2017 in PCT/EP2017/065275, citing documents AN and AO therein, 2 pages.

(Continued)

*Primary Examiner* — Rachel Kahn
(74) *Attorney, Agent, or Firm* — Grüneberg and Myers PLLC

(57) ABSTRACT

A process for producing foam particles composed of thermoplastic elastomers having polyamide segments, comprising the steps:

(a) production of a suspension of pellets of the thermoplastic elastomer in a suspension medium, (b) addition of a blowing agent, (c) impregnation of the pellets with the blowing agent by heating of the suspension in a pressure vessel to an impregnation temperature IMT at an impregnation pressure IMP, depressurization of the suspension by emptying of the pressure vessel via a depressurization device and work-up of the foam particles obtained, and also foam particles obtainable by the process.

11 Claims, No Drawings

(56) References Cited

FOREIGN PATENT DOCUMENTS

| WO | WO 2016/030333 A1 | 3/2016 | | |
|----|-------------------|--------|---|---|
| WO | WO-2016030026 A1 * | 3/2016 | ............ | A43B 13/04 |
| WO | WO-2016052387 A1 * | 4/2016 | ............ | B29C 44/00 |

OTHER PUBLICATIONS

International Preliminary Report on Patentability and Written Opinion issued Jan. 17, 2019 in PCT/EP2017/065275 (English Translation only), citing documents AN and AO therein, 7 pages.

Dr.-Ing. Karl Oberbach, "Kunststoff Taschenbuch", 28$^{th}$ Edition, 2001, 4 pages (submitting the Table of contents and a Statement of Relevancy only).

"Campus® Datasheet—Pebax® 4033 SA 01 MED—TPA—Arkema", Arkema Innovative Chemistry, Source: https://www.campusplastics.com, last updated Feb. 4, 2021, 2 pages.

"Pebax® 5533 SA 01 MED", Pebax by Arkema, 2019, 2 pages.

* cited by examiner

METHOD FOR PRODUCING FOAM PARTICLES MADE OF THERMOPLASTIC ELASTOMERS WITH POLYAMIDE SEGMENTS

The present invention relates to a process for producing foam particles composed of thermoplastic elastomers having polyamide segments by blowing agent impregnation in suspension, and also foam particles obtainable by the process.

WO 2011/134996 describes expandable polyamide pellets and the production thereof by extrusion of a blowing agent-comprising polymer melt and pelletization under water. The blowing agent-comprising pellets can be foamed in a prefoamer to give foam particles and fused together in an automatic molding machine to give expanded polymer foams having a high long-term use temperature and solvent resistance.

WO 2006/045513 describes closed-cell, crosslink foam sheets or plates composed of polyether-polyamide block copolymers, which are obtainable by foaming a crosslinked polymer film or plate loaded with blowing agent in an automatic molding machine or autoclave.

WO 2016/030026 and WO 2016/030333 describe processes for producing expanded polymer particles based on polyamides, e.g. polyether block amides, by impregnation of the polymer melt with a blowing agent and expansion through a nozzle, wherein the polymer comprises a chain extender, for example a styrene-acrylate copolymer having epoxide groups.

WO 2014/198779 describes a process for producing expanded pellets composed of thermoplastic elastomers having a high elongation at break by pelletization of a polymer melt loaded with carbon dioxide or nitrogen. Thermoplastic elastomers mentioned are, inter alia, polyether copolyamides having elastic polyether units and crystalline polyamide units. The foam particles obtained by this process frequently have excessively high bulk densities.

JP-A 60-042432 describes foam particles composed of crosslinked block copolymers made up of crystalline polyamide segments and polyether segments for producing elastic foam moldings. The foam particles obtained by this process likewise have excessively high bulk densities.

Processes for producing expanded foam particles composed of polypropylene (EPP) or biodegradable polyesters by blowing agent impregnation in suspension are, for example, known from EP 2 336 225 A1 or WO 2015/052019.

WO 2015/052265 describes a process for producing expanded, closed-cell thermoplastic elastomer particles having a closed outer skin, a low density and a homogeneous cell distribution by impregnation with gaseous $CO_2$ or $N_2$ in an autoclave reactor. This process requires very high pressures, long impregnation times and is not economically feasible on a large scale.

It was an object of the present invention to provide a process for producing foam particles which are composed of thermoplastic elastomers having polyamide segments and have a low bulk density and are able to be processed to give elastic foam moldings having a high recovery capability.

The object has been achieved by a process for producing foam particles composed of thermoplastic elastomers having polyamide segments, which comprises the following steps:
(a) production of a suspension of pellets of the thermoplastic elastomer in a suspension medium,
(b) addition of a blowing agent,
(c) impregnation of the pellets with the blowing agent by heating of the suspension in a pressure vessel to an impregnation temperature IMT at an impregnation pressure IMP,
(d) depressurization of the suspension by emptying of the pressure vessel via a depressurization device and work-up of the foam particles obtained.

As thermoplastic elastomers, preference is given to using polyamide TPEs (TPA) having soft segments having ether (TPA-ET), ester (TPA-ES) or both ether and ester linkages (TPA-EE), particularly preferably polyether block amides (PEBA).

The thermoplastic elastomer preferably has a nitrogen content in the range from 0.5 to 7.5% by weight, particularly preferably in the range from 1 to 5% by weight. The nitrogen content can be determined by means of elemental analysis. The proportion of the polyamide blocks and thus the proportion of hard segments can be calculated from the nitrogen content.

In general, the thermoplastic elastomers are used in the form of pellets in step (a). Preference is given to using cylindrical, ellipsoidal or spherical pellets having an average diameter of from 0.2 to 10 mm, in particular from 0.5 to 5 mm. In the case of cylindrical or ellipsoidal pellets, the diameter is for the present purposes the longest dimension.

The individual pellets generally have an average mass in the range from 1 to 50 mg, preferably the range from 5 to 25 mg. This average mass of the pellets (particle weight) is determined as arithmetic mean by triplicate weighing of in each case 10 pellets. These preferably cylindrical or round pellets can be produced by all compounding processes known to those skilled in the art with subsequent pelletization as cold or hot cutting. For example by compounding, optionally together with further additives in a twin-screw extruder, expression from the extruder, optionally cooling and pelletization. Such processes are described, for example, in the Kunststoff Taschenbuch, Hauser-Verlag, 28th edition, 2001.

The pellets can comprise not only the thermoplastic elastomer but also optionally customary additives such as antioxidants, stabilizers, flame retardants, waxes, fillers, pigments and dyes. Preference is given to using nucleating agents such as talc, paraffins, waxes, carbon black, graphite, pyrogenic silicas, natural or synthetic zeolites or bentonites in order to adjust the cell structure. These are generally used in amounts in the range from 0.01 to 5% by weight, based on the pellets.

The pellets are suspended in a suitable suspension medium, for example water, polar organic solvents such as alcohols, ketones or mixtures thereof. In general, water is used as suspension medium.

In general, the amount of the suspension medium is selected so that the phase ratio as weight ratio of pellets to suspension medium is in the range from 0.2 to 0.9.

In order to achieve uniform distribution of the pellets in the suspension medium, suspension aids are generally added. Suitable suspension aids are water-insoluble inorganic stabilizers such as tricalcium phosphate, magnesium pyrophosphate, metal carbonate such as calcium carbonate and also polyvinyl alcohol and ionic or nonionic surfactants. The suspension aids are usually employed in amounts of from 0.01 to 5% by weight.

In step (b), a blowing agent is added. Volatile substances having a boiling point at atmospheric pressure in the range from −10 to 125° C. or gases such as carbon dioxide or nitrogen are generally used. The bulk density, cell structure and crystallinity of the polymer matrix can be influenced by the choice of the type and amount of the blowing agent. Preference is given to using hydrocarbons having from 3 to 6 carbon atoms, in particular n-butane and isobutane, carbon dioxide, nitrogen or mixtures thereof as blowing agents. Particular preference is given to using butane. The blowing agents are generally used in amounts of from 1 to 50% by weight, based on the pellets.

Nitrogen can also be introduced as co-blowing agent at an onset temperature below the first melting peak in the DSC of the thermoplastic elastomer, for example in the range from 30 to 75° C., by injection and raising of the internal pressure in the impregnation reactor by from 200 to 3000 kPa.

The impregnation in step (c) is preferably carried out at an impregnation temperature IMT in the range from 80 to 180° C. For this purpose, the suspension is generally heated at a heating rate of preferably 2° C./min or higher to the impregnation temperature (IMT) and optionally maintained at this temperature or in a range from 2° C. above the IMT to 5° C. below the IMT for a period of from 2 to 100 minutes (hold time HT).

Depending on the type and amount of the blowing agent and the temperature or the treatment with a gas, a pressure (impregnation pressure IMP) is established in the closed pressure vessel. The impregnation in step (c) is preferably carried out at an impregnation pressure IMP in the range from 150 to 5500 kPa, particularly preferably in the range from 500 to 4000 kPa absolute.

In step (c), the pressure vessel is preferably supplied with nitrogen and the impregnation pressure IMP set at a temperature of the suspension in the range from 30 to 75° C.

The blowing agent-comprising pellets obtained in step (c) are foamed to give foam particles by depressurization in a subsequent step (d). The depressurization of the suspension in step (d) is generally effective by emptying the pressure vessel via an opened shut-off valve into an expansion vessel. As shut-off valve, it is possible to use a valve, a slider, a cock or a flap, with preference being given to ball valves. During emptying of the pressure vessel, the suspension can be depressurized directly to atmospheric pressure (1013 Pa) or in an intermediate vessel having a gauge pressure in the range from 100 to 1000 kPa. It can also be advantageous to keep the pressure (expression pressure) in the pressure vessel constant during depressurization by introduction of nitrogen or increase the pressure further to an expression pressure of up to 6000 kPa, preferably to a range from 3000 to 4000 kPa, by injection of nitrogen a few seconds before the depressurization. The increase in the expression pressure makes it possible to obtain foam particles having a lower bulk density and a narrower foam particle size distribution.

In step (d), the suspension is preferably brought into contact with a liquid coolant downstream of the depressurization apparatus. This step, which is also referred to as quenching, has been described, for example, for the production of expandable polypropylene (EPP) in EP-A 2 336 225. The process of the invention is preferably carried out using an amount of water which corresponds to the formula (mass of quenching water)/(mass of suspension medium)=0.5–2.0.

In an optional work-up step, the suspension aids which have been used and are still adhering to the foam particles can be removed from the foam particles obtained. The foam particles are subsequently washed and separated off from the liquid phase by filtration or centrifugation and then dried.

The foam particles composed of thermoplastic elastomers having polyamide segments which are obtainable by the process of the invention preferably have a bulk density in the range from 20 to 250 kg/m$^3$, particularly preferably in the range from 35 to 150 kg/m$^3$ and very particularly preferably in the range from 40 to 120 kg/m$^3$.

The expanded foam particles are generally at least approximately spherical. The precise geometric shape or the diameter is dependent on the selected geometry and the particle weight of the starting pellets and on the bulk density produced.

The expanded foam particles produced according to the invention are predominantly closed-celled, with the determination of the proportion by volume of closed cells being carried out by a method based on DIN EN ISO 4590 of Aug. 1, 2003, and generally have a cell density (number of cells/area) of from 1 to 750 cells/mm$^2$, preferably from 2 to 500 cells/mm$^2$, in particular from 5 to 200 cells/mm$^2$ and particularly preferably from 10 to 100 cells/mm$^2$.

To characterize the crystalline structure, the expanded foam particles can be examined by differential scanning calorimetry (DSC) in accordance with ISO 11357-3 (German version of Apr. 1, 2013). For this purpose, 3-5 mg of the foam particles are heated between 20° C. and 200° C. at a heating rate of 20° C./min and the resulting heat flow is determined in the $1^{st}$ run. Depending on the type of the thermoplastic elastomers used, at least two endothermic peaks can in each case be determined in the $1^{st}$ DSC run.

The foam particles can be fused together by means of steam to give foam moldings having a low density of the molding. The density of the molding is preferably in the range 70-300 kg/m$^3$, particularly preferably in the range 80-200 kg/m$^3$.

Depending on the type and proportion of the soft phase in the thermoplastic polyamide elastomers used, surprisingly low steam pressures below 250 kPa (gauge pressure), in particular in the range from 80 to 150 kPa, can be used.

The mechanical properties of the foam moldings obtained by fusion of the foam particles obtainable by the process of the invention generally also depend on the thermoplastic polyamide elastomers used and on the type of filling process used in production of the moldings.

However, the foam moldings surprisingly display a high elasticity and recovery ability over a wide hardness range (Shore hardness A) of the thermoplastic polyamide elastomers used. They always have a ball rebound resilience measured in accordance with DIN EN ISO 8307:2007 (Determination of resilience by ball rebound DIN EN ISO 8307:2008-03) of at least 55%.

The invention will be illustrated by the following examples, without being restricted thereby:

EXAMPLES

Test Methods:
The following test methods and parameters were used, inter alia, to characterize the raw materials used and also the resulting foam particles and moldings:
Melting Point Determination by Means of DSC:
Procedure in accordance with ISO 11357-3 (German version of Apr. 1, 2013) using a DSC Q100 from TA Instruments. To determine the melting point of the thermoplastic elastomers used or of other thermoplastic elastomers according to the invention in pellet form, 3-5 mg are heated at a heating rate of 20° C./min in a $1^{st}$ run between 20° C. and 200° C., subsequently cooled at 10° C./min to 20° C., followed by a further heating cycle ($2^{nd}$ run) at a heating rate of 10° C./min. The temperature of the peak maximum in the $2^{nd}$ run was reported as melting point.

Crystalline Structure by DSC:

To characterize the crystalline structure of the compact thermoplastic elastomer or the expanded foam particles, 3-5 mg are heated at a heating rate of 20° C./min between 20° C. and 200° C. and the resulting heat flow is determined.

Bulk Density:

The determination was carried out by a method based on DIN EN ISO 60: 2000-1. Here, the foam particles were introduced into a measuring cylinder having a known volume with the aid of a funnel having a predetermined geometry (completely filled with bulk material), the excess of the bulk material was struck off from the measuring cylinder by means of a straight-edged bar and the contents of the measuring cylinder were determined by weighing.

The funnel used has a height of 40 cm, an opening angle of 35° C. and an outlet having a diameter of 50 mm. The measuring cylinder had an internal diameter of 188 mm and a volume of 10 l.

The bulk density (BD) is given by the mass of the bed [kg]/0.01 [m$^3$].

The average of 3 measurements in kg/m$^3$ was reported as bulk density.

Degree of Compaction DC

The degree of compaction DC is the ratio of density of the molding (M density) to bulk density (BD). DC=M density [kg/m$^3$]/BD [kg/m$^3$].

Hot Storage

The test specimens (180×60×M density mm) were placed in an oven which had been preheated to the appropriate storage temperature (110° C.) and stored at this temperature for 96 hours.

Assessment of the Surfaces/Edges as Follows:

The surface and edge of the test specimens was assessed every 24 hours during the storage time according to a scale of grades. For this purpose, the test specimens were briefly taken from the oven.

| Evaluation | Grade |
|---|---|
| No change | 1 |
| Abrasion at edge | 2 |
| Disintegration of edge | 3 |
| Disintegration of the edge plus 0 to 5 mm deep damage to the surface | 4 |
| Disintegration of the edge plus 5 to 10 mm deep damage to the surface | 5 |
| Sample disintegrates under gentle thumb pressure | 6 |

After the end of the hot storage, the test specimens were carefully taken from the oven, stored at room temperature for 24 hours under room conditions and the change in dimensions was subsequently measured by means of the sliding caliber.

The change in dimensions (length, width, height) is calculated according to the following formula:

$$CD=[(Lo-L1)/Lo]\times 100$$

CD=change in dimension in %
Lo=original dimension
L1=dimension after hot storage The heat resistance was satisfactory (OK) when surfaces and edges did not display any changes and the average change in dimensions over length, width and height was <10%. It is limited when this change in dimensions is achieved only in the case of storage at lower temperatures.

Starting Materials

A TPA-EE, i.e. a polyether block amide (PEBA), was used as thermoplastic polyamide elastomer (TPA) in the examples according to the invention. Such products are supplied, for example, by Arkema Speciality Polyamides under the tradename PEBAX. The products listed in table 1 consist of flexible polytetrahydrofuran and crystalline polyamide units (PA-12).

TABLE 1 thermoplastic polyamide elastomers used

| Pebax | | 2533 SA 01 | 3533 SA 01 | 4033 SA 01 | 7233 SA 01 |
|---|---|---|---|---|---|
| Density [g/cm$^3$] | ISO 1183 | 1.00 | 1.00 | 1.00 | 1.01 |
| Melting point [° C.] | ISO 11357 | 134 | 144 | 160 | 174 |
| Vicat temperature (at 1 daN) [° C.] | ISO 306 | 58 | 77 | 131 | 164 |
| Hardness [Shore A/Shore D] | ISO 868 | 77/27 | 82/33 | 90/42 | —/69 |
| Characterization by described methods | | | | | |
| Pellets, particle weights [mg] | | 18 | 21 | 21 | 17 |
| Pellets, bulk density [kg/m$^3$] | | 602 | 589 | 614 | 588 |
| DSC Tmax (1$^{st}$ run) [° C.] | | 70/142 | 78/149 | —/164 | —/171 |
| Elemental analysis (EA) N [%] | | 1.4 | 1.8 | 3.4 | 6.6 |
| Proportion of PA block [% by weight] (calculated from N from EA) | | 19.8 | 25.4 | 48.0 | 93.1 |

Production of the Expanded Thermoplastic Elastomer

General Experimental Description

Pellets having a particle weight of about 19 mg, whose composition is described in table 1, were used.

Examples 1-4 and 6-13

The experiments were carried out with a degree of fill of the vessel of 80% and a phase ratio of 0.41.

100 parts by weight (corresponding to 28.5% by weight, based on the total suspension without blowing agent) of the pellets, 245 parts by weight (corresponding to 69.6% by weight, based on the total suspension without blowing agent) of water, 6.7 parts by weight (corresponding to 1.9% by weight, based on the total suspension without blowing agent) of calcium carbonate, 0.13 part by weight (corresponding to 0.04% by weight, based on the total suspension without blowing agent) of a surface-active substance (Lutensol AT 25) and the appropriate amount of butane as blowing agent (based on the amount of pellets used) were heated while stirring. Nitrogen was then additionally injected at a temperature of the liquid phase of 50° C. and the internal pressure was set to a previously defined pressure (800 kPa). Depressurization is subsequently carried out via a depressurization apparatus after attainment of the impregnation temperature (IMT) and optionally after a hold time (HT) and at the impregnation pressure (IMP) set at the end. The gas space is here brought to a predetermined expression pressure and kept constant during the depressurization. The depressurization jet can optionally be cooled by means of a particular volume flow of water having a particular temperature (water quench) downstream of the depressurization apparatus. In examples 1-4 and 10, cooling was carried out using an amount of water at 25° C. which corresponds to the ratio (mass of quenching water)/(mass of suspension medium)=0.85.

After removal of the suspension aid (dispersant and soap) and drying, the bulk density (BD) of the resulting particles is measured.

Example 5

As for examples 1-4, but 12% by weight of $CO_2$ are used instead of butane as blowing agent and no additional nitrogen is injected.

Example 14

The experiment was carried out with a degree of fill of the vessel of 70% and a phase ratio of 0.27.

100 parts by weight (corresponding to 21.2% by weight, based on the total suspension without blowing agent) of the pellets, 365 parts by weight (corresponding to 77.4% by weight, based on the total suspension without blowing agent) of water, 6.7 parts by weight (corresponding to 1.4% by weight, based on the total suspension without blowing agent) of calcium carbonate, 0.14 part by weight (corresponding to 0.03% by weight, based on the total suspension without blowing agent) of a surface-active substance (Lutensol AT 25) and the appropriate amount of butane as blowing agent (based on the amount of pellets used) were heated while stirring. No additional injection of nitrogen was carried out at 50° C. Depressurization is subsequently carried out via a depressurization apparatus after attainment of the impregnation temperature (IMT) and optionally after a hold time (HT) and at the impregnation pressure (IMP) set at the end. The gas space is here brought to a predetermined expression pressure (3700 kPa) and kept constant during the depressurization.

After removal of the suspension aid (dispersant and soap) and drying, the bulk density (BD) of the resulting foam particles is measured.

Examples 15 and 16

The experiments were carried out with a degree of fill of the vessel of 80% and a phase ratio of 0.31.

100 parts by weight (corresponding to 23.4% by weight, based on the total suspension without blowing agent) of the pellets, 320 parts by weight (corresponding to 75.0% by weight, based on the total suspension without blowing agent) of water, 6.7 parts by weight (corresponding to 1.6% by weight, based on the total suspension without blowing agent) of calcium carbonate, 0.13 part by weight (corresponding to 0.03% by weight, based on the total suspension without blowing agent) of a surface-active substance (Lutensol AT 25) and the appropriate amount of butane as blowing agent (based on the amount of pellets used) were heated while stirring.

In the case of example 15, no additional nitrogen is injected. In the case of example 16, nitrogen was additionally injected and the internal pressure set to a previously defined pressure (800 kPa) at a temperature of the liquid phase of 50° C.

The further course of the experiment is as in example 14.

The experimental parameters (blowing agent, amount of blowing agent, impregnation temperature (IMT), impregnation pressure (IMP), expression pressure) and the resulting bulk density (BD) for examples 1 to 16 according to the invention are reported in table 2.

The phase ratio is defined as the ratio of pellets, measured in kilograms, to suspension medium, which is preferably water, likewise in kilograms.

The hold time (HT) is defined as the time [min] for which the temperature of the liquid phase is in a temperature range from 5° C. below the IMT to 2° C. above the IMT.

Production of the Moldings:

The production of the moldings was carried out on a commercial automatic EPP molding machine (model K68 from Kurtz GmbH). Cuboidal test specimens having different thicknesses were produced using tools having the dimensions 315×210×25 mm and 315*210*20 mm. The moldings were produced by the pressure filling process or the crack filling process. After production of the moldings, the moldings were stored at 60° C. for 16 hours.

The results of the subsequent tests on the moldings are reported in table 3.

TABLE 2

Experimental parameters for examples 1 to 16

| Example | Type of pellets | Blowing agent | Blowing agent contents [% by weight] | T [° C.] of the suspension at $N_2$ introduction | IMT [° C.] | Hold time [min] | IMP [kPa] | Expression pressure [kPa] | Water quench | Bulk density BD [kg/m³] |
|---|---|---|---|---|---|---|---|---|---|---|
| Example 1 | Pebax 2533 SA 01 | Butane | 24.0 | 50 | 100.0 | 2 | 1970 | 3400 | yes | 94 |
| Example 2 | Pebax 2533 SA 01 | Butane | 24.0 | 50 | 95.0 | 2 | 1830 | 3400 | yes | 141 |
| Example 3 | Pebax 2533 SA 01 | Butane | 24.0 | 50 | 90.0 | 15 | 1670 | 3400 | yes | 213 |
| Example 4 | Pebax 2533 SA 01 | Butane | 24.0 | 50 | 95.0 | 13 | 1800 | 3400 | yes | 104 |
| Example 5 | Pebax 2533 SA 01 | $CO_2$ | 12.0 | — | 100.0 | 11 | 3010 | 3700 | yes | 215 |
| Example 6 | Pebax 3533 SA 01 | Butane | 24.0 | 50 | 100.0 | 4 | 1810 | 3400 | no | 206 |
| Example 7 | Pebax 3533 SA 01 | Butane | 24.0 | 50 | 103.0 | 20 | 1960 | 3400 | no | 136 |
| Example 8 | Pebax 3533 SA 01 | Butane | 24.0 | 50 | 105.5 | 17 | 2020 | 3400 | no | 107 |
| Example 9 | Pebax 3533 SA 01 | Butane | 24.0 | 50 | 106.5 | 15 | 2030 | 3400 | no | 92 |
| Example 10 | Pebax 3533 SA 01 | Butane | 24.0 | 50 | 106.5 | 17 | 2020 | 3400 | yes | 131 |
| Example 11 | Pebax 4033 SA 01 | Butane | 24.0 | 50 | 132.0 | 3 | 2750 | 3700 | no | 81 |
| Example 12 | Pebax 4033 SA 01 | Butane | 24.0 | 50 | 135.0 | 3 | 2780 | 3700 | no | 40 |
| Example 13 | Pebax 4033 SA 01 | Butane | 24.0 | 50 | 130.0 | 3 | 2880 | 3700 | no | 113 |
| Example 14 | Pebax 7233 SA 01 | Butane | 24.0 | — | 156.0 | 3 | 2350 | 3700 | no | 84 |
| Example 15 | Pebax 7233 SA 01 | Butane | 24.0 | — | 156.0 | 3 | 2960 | 3700 | no | 36 |
| Example 16 | Pebax 7233 SA 01 | Butane | 24.0 | 50 | 152.0 | 3 | 3530 | 3700 | no | 48 |

TABLE 3

Tests on moldings produced from foam particles from examples 1 to 16

| Molding | Foam particles (table 2) | DC | Density of the molding [kg/m³] DIN EN ISO 845 (Oct. 1, 2009) | Tensile stress [kPa] DIN EN ISO 1798 (Apr. 1, 2008) | Compressive stress [kPa] DIN EN ISO 844 (Nov. 1, 2014) at 50% compression | Elongation at break [%] DIN EN ISO 1798 (Apr. 1, 2008) | Rebound resilience [%] DIN EN ISO 8307 (Jan. 1, 2008) | Heat resistance |
|---|---|---|---|---|---|---|---|---|
| M-1 | Example 1 | 2.1 | 200 | 400 | 165 | 75 | 69 | n.d. |
| M-2 | Example 2 | 1.8 | 260 | 450 | 300 | 75 | 68 | limited (OK at 90° C.) |
| M-4 | Example 4 | 2.0 | 210 | 250 | 165 | 55 | 73 | n.d. |
| M-5 | Example 5 | 2.0 | 410 | 980 | 650 | 138 | 66 | n.d. |
| M-7 | Example 7 | 2.1 | 280 | 490 | 380 | 56 | 75 | OK (CD < 10%) |
| M-8 | Example 8 | 2.0 | 215 | 200 | 250 | 26 | 75 | n.d. |
| M-9 | Example 9 | 2.4 | 220 | 450 | 260 | 58 | 73 | OK (CD < 10%) |
| M-10 | Example 10 | 2.1 | 280 | 480 | 390 | 55 | 74 | OK (CD < 10%) |
| M-11 | Example 11 | 1.9 | 150 | 530 | 360 | 35 | 65 | OK (CD < 1%) |
| M-12 | Example 12 | 2.4 | 95 | 350 | 170 | 45 | 64 | n.d. |
| M-13 | Example 13 | 1.7 | 190 | 490 | 500 | 35 | 61 | OK (CD < 1%) |
| M-16 | Example 16 | 4.0 | 160 | 200 | 450 | 20 | 45 | OK (CD < 1%) | n.d. not determined
M-5 and M-16 were produced by the crack filling process.

The invention claimed is:

1. A process for producing foam particles composed of one or more thermoplastic elastomers having polyamide segments, the process comprising:
    adding a blowing agent to a suspension of pellets of a polymer in a suspension medium;
    impregnating the pellets with the blowing agent by heating the suspension in a pressure vessel to an impregnation temperature IMT, which is from 80 to 180° C., at an impregnation pressure IMP in the range of from 500 to 3010 kPa absolute;
    depressurizing the suspension by emptying the pressure vessel with a depressurization device, thereby obtaining foam particles; and
    obtaining a foam molding by fusing the foam particles with steam at a gauge pressure of from 80 to 150 kPa,
    wherein the polymer content in the pellets consists of the one or more thermoplastic elastomers having polyamide segments;
    wherein the process is a batchwise process;
    (a) wherein the blowing agent consists of carbon dioxide;
    (b) wherein the foam particles have a bulk density of from 20 to 250 kg/m³;
    wherein the impregnating by heating the suspension, is followed by keeping the suspension at a temperature of from 2° C. above the impregnation temperature (IMT) to 5° C. below the impregnation temperature (IMT) for a period of from 2 to 100 minutes;
    wherein the blowing agent is used in amounts of from 1 to 50% by weight, based on the weight of the pellets;
    wherein the thermoplastic elastomer having polyamide is a polyether block amide (PEBA);
    wherein the PEBA consists of flexible polytetrahydrofuran and crystalline polyamide 12 units; and
    wherein the PEBA has 19.8 to 25.4% by weight polyamide blocks.

2. The process according to claim 1, wherein the pellets have an average mass of from 1 to 50 mg.

3. The process according to claim 1, wherein the suspension medium comprises water.

4. The process according to claim 1, wherein the depressurizing of the suspension is effected by emptying the pressure vessel with a ball valve into an expansion vessel.

5. The process according to claim 1, wherein, during the depressurizing, the suspension is brought into contact with a liquid coolant downstream of the depressurization device.

6. The process according to claim 1, wherein the foam molding has a ball rebound resilience of at least 55%, as measured in accordance with DIN EN ISO 8307.

7. The process according to claim 1, wherein the foam molding has a bulk density of 200 to 300 kg/m³.

8. The process according to claim 1, wherein the foam particles have a bulk density of 120 to 250 kg/m³.

9. The process according to claim 1, wherein the foam particles have a bulk density of 150 to 250 kg/m³.

10. The process according to claim 1, wherein the suspension is kept at a temperature of from 2° C. above the impregnation temperature (IMT) to 5° C. below the impregnation temperature (IMT) for a period of from 2 to 20 minutes.

11. The process according to claim 1, wherein the blowing agent is used in an amount of 12-50% by weight of the pellets.

* * * * *